United States Patent [19]

Zwezerynen

[11] 4,417,653
[45] Nov. 29, 1983

[54] CONVEYOR

[75] Inventor: Johannes C. W. Zwezerynen, Auckland, New Zealand

[73] Assignee: Aico Manufacturing Co. Limited, Auckland, New Zealand

[21] Appl. No.: 267,293

[22] Filed: May 26, 1981

[51] Int. Cl.³ .............................................. B65G 19/00
[52] U.S. Cl. ..................................... 198/718; 198/732
[58] Field of Search ............... 198/717, 718, 725, 728, 198/732

[56] References Cited

U.S. PATENT DOCUMENTS 3,583,545 6/1971 Hovekamp ........................ 198/718
4,266,482 5/1981 Barber ............................... 198/718

Primary Examiner—Joseph F. Valenza
Assistant Examiner—Jonathan D. Holmes
Attorney, Agent, or Firm—Young & Thompson

[57] ABSTRACT

A pusher conveyor has a series of retractable pushers pivotally connected to an endless chain. The pushers are provided with guide pins which run in guide tracks parallel to the conveyor path. Switches are provided between the guide tracks to guide the pins from one track to another to thereby extend or retract the pushers to engage or disengage articles along the conveyor path. The switches can be coupled to sensors, to enable articles to be stacked along the conveyor path.

6 Claims, 3 Drawing Figures

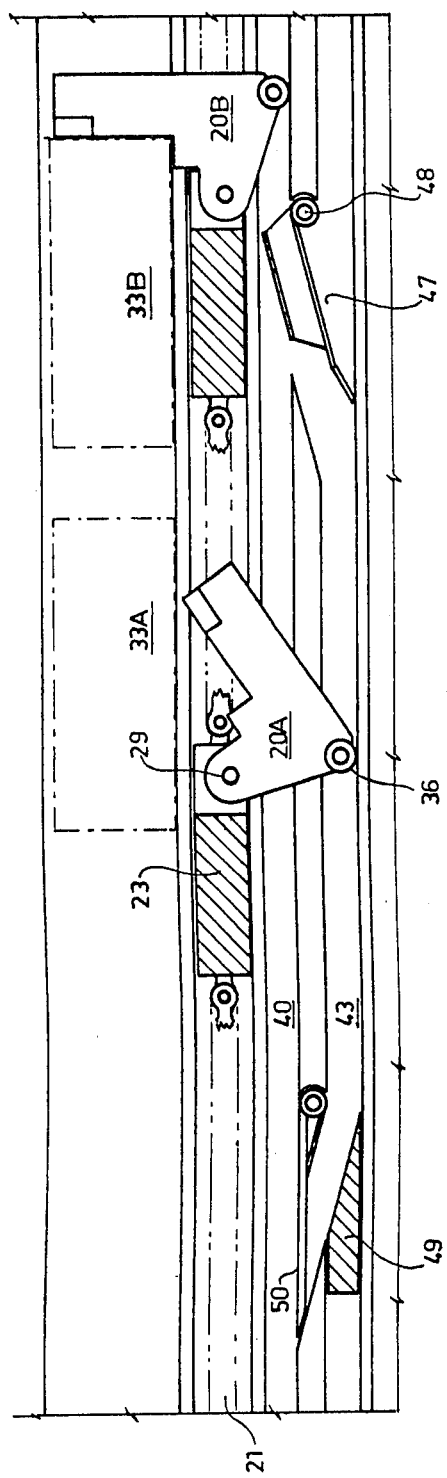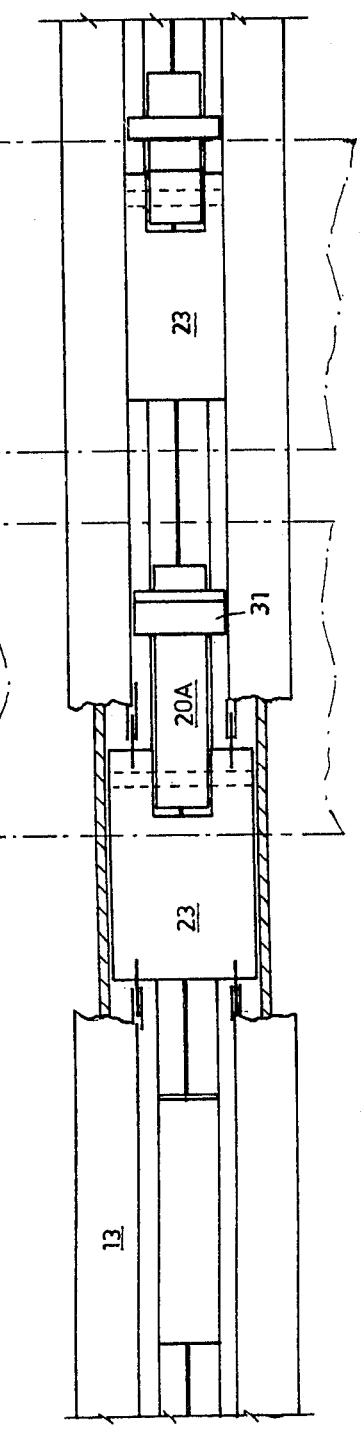

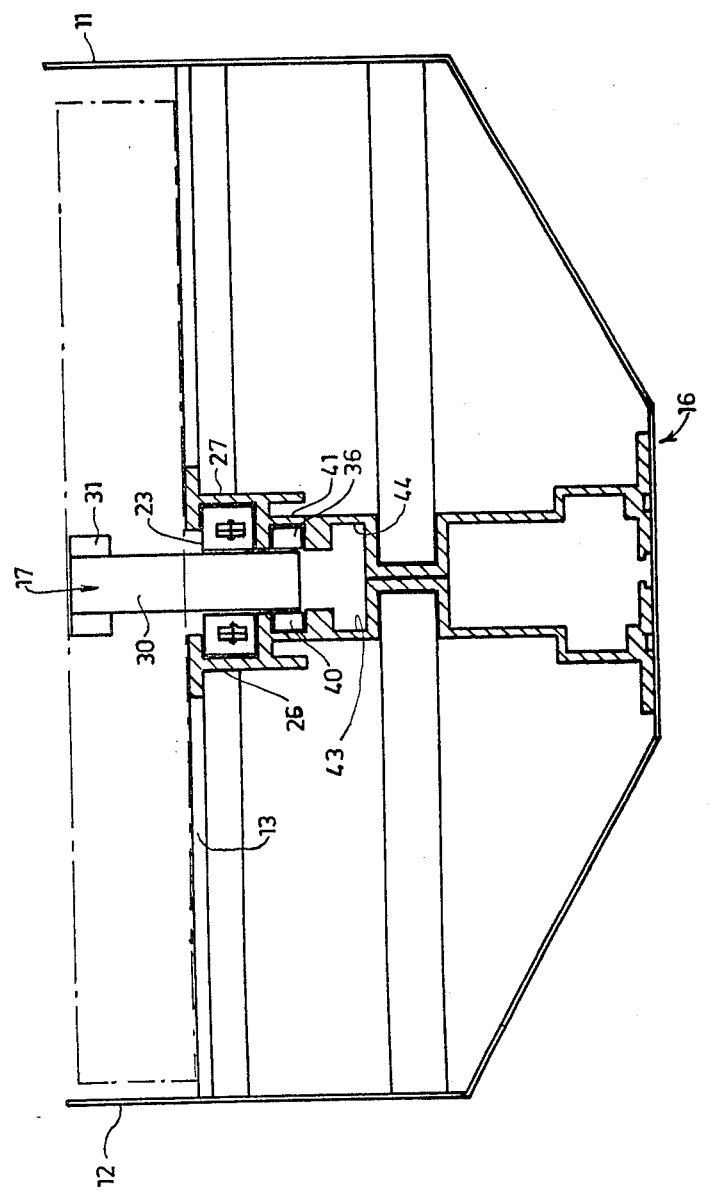

CONVEYOR

This invention relates to conveyors and has particular application to pusher conveyors where one or more pushers are caused to engage with an article to move it along a conveyor path.

Various proposals have been made for pusher conveyors, see for example the following:

NZP. 147862 to The Mead Corporation.
NZP. 175504 to Alvey Inc.
NZP. 173937 to Jervis B. Webb & Co.
NZP. 147861 to The Mead Corporation.

There is a need for a pusher conveyor which is both simple to construct and operate, and at the same time provides for versatility in operation.

It is an object of this invention to provide an improved conveyor or which will at least provide the public with a useful choice.

In one aspect, the invention provides a conveyor, including: a conveyor surface along which articles can be conveyed, one or more retractible pushers capable of moving along a path substantially parallel to said conveyor surface, the or each said pusher being provided with guide means; means for moving the pushers along said conveyor path; a plurality of guide tracks capable of guiding said guide means; and means for switching said guide means between said guide tracks to control the extension or retraction of the or each pusher relative to the conveyor surface.

Other aspects of this invention, which should be considered in all its novel aspects, will become apparent from the following description, which is given by way of example only, with reference to the accompanying drawings, in which:

FIG. 1 illustrates a longitudinal section through a portion of a preferred conveyor.

FIG. 2 illustrates a top plan view of a portion of a preferred conveyor.

FIG. 3 illustrates a cross-section through the preferred conveyor.

The conveyor illustrated in the drawings will be described with reference to a conveyor suitable for moving rectangular cartons, for example, cardboard boxes. It will however be appreciated that the conveyor can be adapted to the movement of diffreeent shaped articles, depending upon the user's requirements.

Turning firstly to FIG. 3, the conveyor 10 may have side walls, 11, 12 and an article supporting surface 13. Conveniently, the article supporting surface 13 is provided with a smooth surface to enable articles to slide readily thereon. For example, the surface 13 may be formed by strips or sheets of a low friction material, for example, a plastics material such as high density nylon, polyethylene or teflon, or rollers can be used.

The side walls 11 and 12 may be formed into a housing as shown, which is conveniently closed off at the bottom 16.

The pusher conveyor 17 is situated along the centre of the conveyor 10. This consists of a series of pusher elements 20 connected to an endless chain 21. Conveniently, the chain 21 is a double element chain connected to pads or sliders 23 which ride in a pair of channels 26,27. The pushers 20 are pivoted at 29 to these slider pads.

The channels 26, 27 are situated just below the article supporting surface 13, leaving a gap therebetween from which the pusher 20 can protrude into the article supporting area. Each pusher 20 is capable of being retracted below the article slide surface 13.

Each pusher has a main stem 30 and a cross piece 31 capable of engaging an article, e.g. a carton 33. A pair of guide pins 36 extend on each side of each pusher and fit within a guide track.

A pair of upper guide tracks, 40, 41 are provided below the channels 26, 27, and a pair of lower guide tracks 43, 44 are also situated below the upper guide tracks.

A series of switches 47 are provided between the upper and lower guide tracks. Conveniently, these are pivotally mounted switch rails, 48 as shown in FIG. 1.

In addition, a guide ramp 49 may be provided at the end of a conveyor section to guide the guide pins from the lower track 43 to the upper guide track 40. Such a guide ramp can have a pivotally mounted flap 50 to allow a guide pin to move from the lower to the upper track whilst preventing a guide pin which is moving along the upper track from falling into the lower track.

It will be appreciated that the up ramps 49 and switches 47 can be arranged so as to face either direction to enable switching from the upper to lower guide tracks and vice versa.

The switches may be operated manually or automatically. For example, the switches may be connected to sensors so as to be switched from one position to another depending upon the position of cartons of the conveyor. For example, a simple sensor would involve a movable finger extending into the path of the cartons, so as to be pushed out of the way by the movement of a carton along the conveyor. Movement of such a finger can be coupled mechanically, electrically, hydraulically or by any other means to a suitable switch 47 to control the position of the pushers. For example, if a suitable sensor S.1 is situated on the conveyor path, say above the ramp 49, and is coupled to switch 47, the conveyor could be arranged to stack cartons between the sensor and the switch 47. This sensor S.1 will correspond to the position of sensor S.2 illustrated in FIG. 1.

This would operate as follows. With the pushers entering the feeding zone of the conveyor in say the up position shown by pusher 20b, the pusher would engage a carton, at position 33b and move it along the conveyor. When a preceding carton contacts the sensor S.1 this will cause the switch 47 to move into the down position as shown in FIG. 1. Consequently the pusher will move from the up position to the down position shown by pusher 20a, as its guide pin is moved from the upper guide track to the lower guide track 43 by moving down the switch ramp 47. The pusher will then move underneath the carton, e.g. shown by pusher 20a moving underneath 33a leaving carton 33a stationary. A sequence of cartons can then be stacked at this point on the conveyor by the pushers ducking underneath the cartons when they reach the switch 47. If required, a series of sensors can be positioned along the conveyor path to operate a series of switches to cause the pushers to move selectively up and down to engage or disengage cartons as required.

Preferably, the spacing between the pushers, and the spacing between the switches can be such that cartons can be stacked at intervals along the conveyor, and so arranged that the pushers can be moved into their extended or raised positions so as to engage the cartons sequentially.

By providing each sensor in close conjunction with each switch, e.g. on top of or just downstream of a switch location, and connecting each sensor to the next upstream switch, the sensors and switches can be combined to define decision points for the pushers. The spacing of the pushers is preferably greater than the switch spacing, so that a first pusher can move past a first decision point before a second pusher reaches a second decision point. For example, if a carton is stacked at a first descision point after the first pusher has moved away from the first decision point, that sensor will operate the switch at the second decision point before the second pusher reaches the second decision point. Thus, if the required operation is the stacking of cartons, the stacking of the first carton will cause the next carton to be stacked at the next decision point, and so on.

Conversely, where the cartons are stacked, and the pushers are down, each pusher can be raised in turn to engage the cartons sequentially.

This is advantageous where the cartons are fully laden to thereby minimise the power required to move a series of fully laden cartons from a stationary position. By this means, the spacing between the cartons and the spacing between the pushers will be out of phase with one another so that a first pusher will engage a first carton slightly before a second pusher will engage the second carton and so on.

The movement of the guide pins of the pushers between upper and lower guide tracks is such that the switches can be controlled automatically to enable the conveyor to accept cartons from different feed points, to enable the cartons to be stacked where required or moved selectively in a variety of ways.

It will thus be appreciated that the conveyor of this invention is versatile and can be adapted to many different applications.

Finally, it will be appreciated that various alterations or modifications may be made to the foregoing without departing fromt the scope of this invention, as exemplified by the following claims.

I claim:

1. A conveyor including a conveying surface along which articles can be conveyed; a plurality of spaced retractable pushers capable of moving along a path substantially parallel to said conveyor surface, each said pusher being provided with guide means; means for moving the pushers along said conveyor path, a plurality of guide tracks capable of guiding said guide means; a plurality of spaced means for switching said guide means between said guide tracks to control the extension or retraction of each pusher relative to the conveyor surface, the pushers being spaced greater than the spacing of the switch means to enable articles to be stacked on said conveyor surface in an out-of-phase relationship with said pushers, whereby during start up the pushers sequentially engage a plurality of stationary articles one by one.

2. A conveyor as claimed in claim 1, wherein the means for moving the pushers consists of a conveyor chain on which each pusher is mounted.

3. A conveyor as claimed in claim 2, wherein each pusher is pivotally mounted on a pad forming part of the conveyor chain.

4. A conveyor as claimed in claim 1, wherein the guide means consists of one or more pins protruding from each pusher.

5. A conveyor as claimed in claim 4, wherein the guide tracks are parallel to said conveyor path, and said switch means include switch rails.

6. A conveyor as claimed in claim 1, said guide tracks comprising vertically superposed upper and lower tracks, said upper tracks supporting said guide means when said pusher is extended and said lower tracks supporting said guide means when said pusher is retracted, said switching means permitting said guide means selectively to follow either said upper or said lower tracks, a ramp for returning said guide means from said lower tracks to said upper tracks, and a pivotally mounted flap above said ramp to permit guide means on said upper tracks to pass over said ramp, said flap pivoting to permit guide means on said ramp to pass said flap and resume travel on said upper guide tracks.

* * * * *